May 18, 1937.  D. W. NORWOOD  2,080,434
ILLUMINATION REFLECTOR FOR USE IN PHOTOGRAPHY
Filed Aug. 31, 1934   3 Sheets-Sheet 1
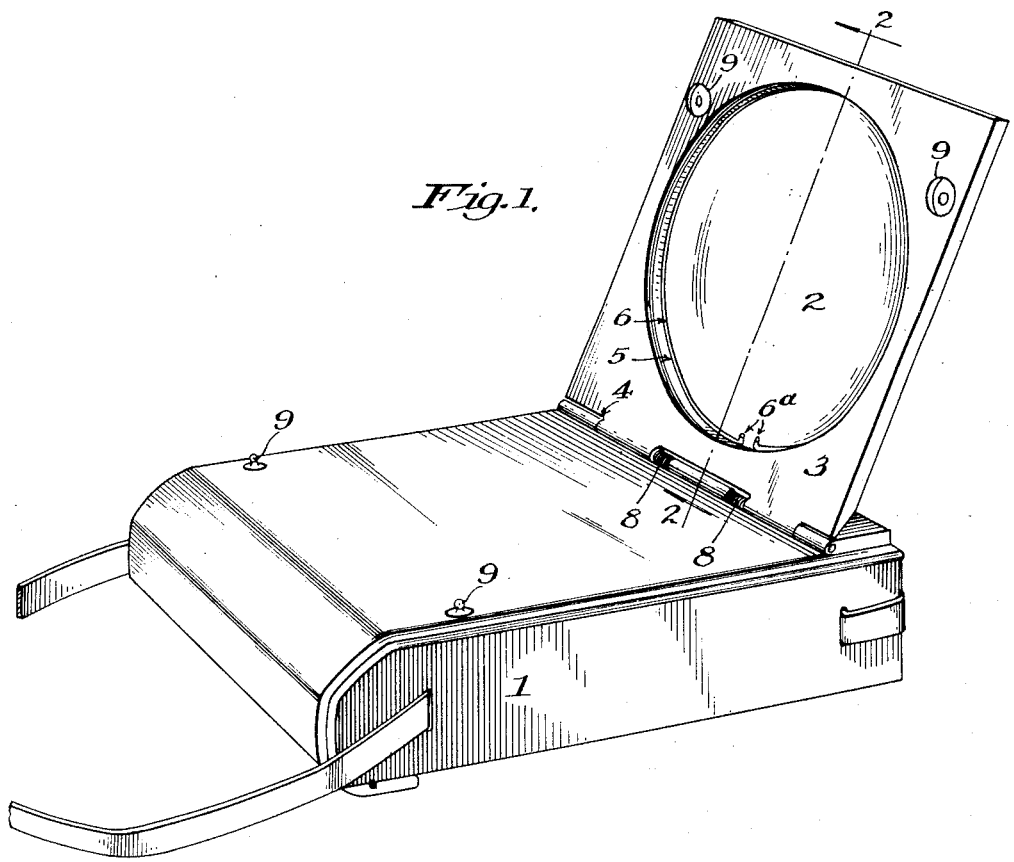
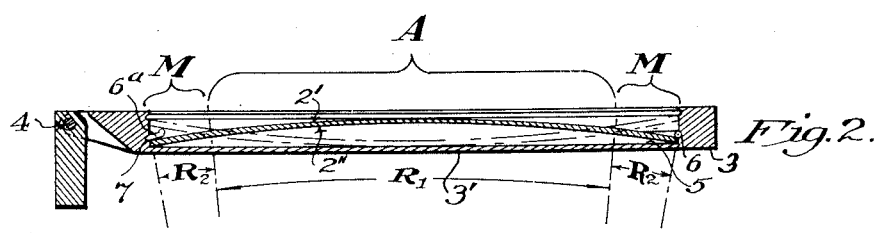
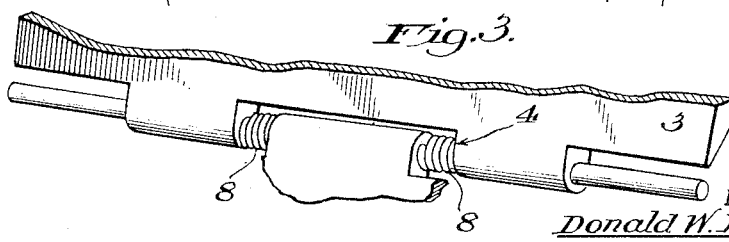
INVENTOR.
Donald W. Norwood
BY
ATTORNEYS.

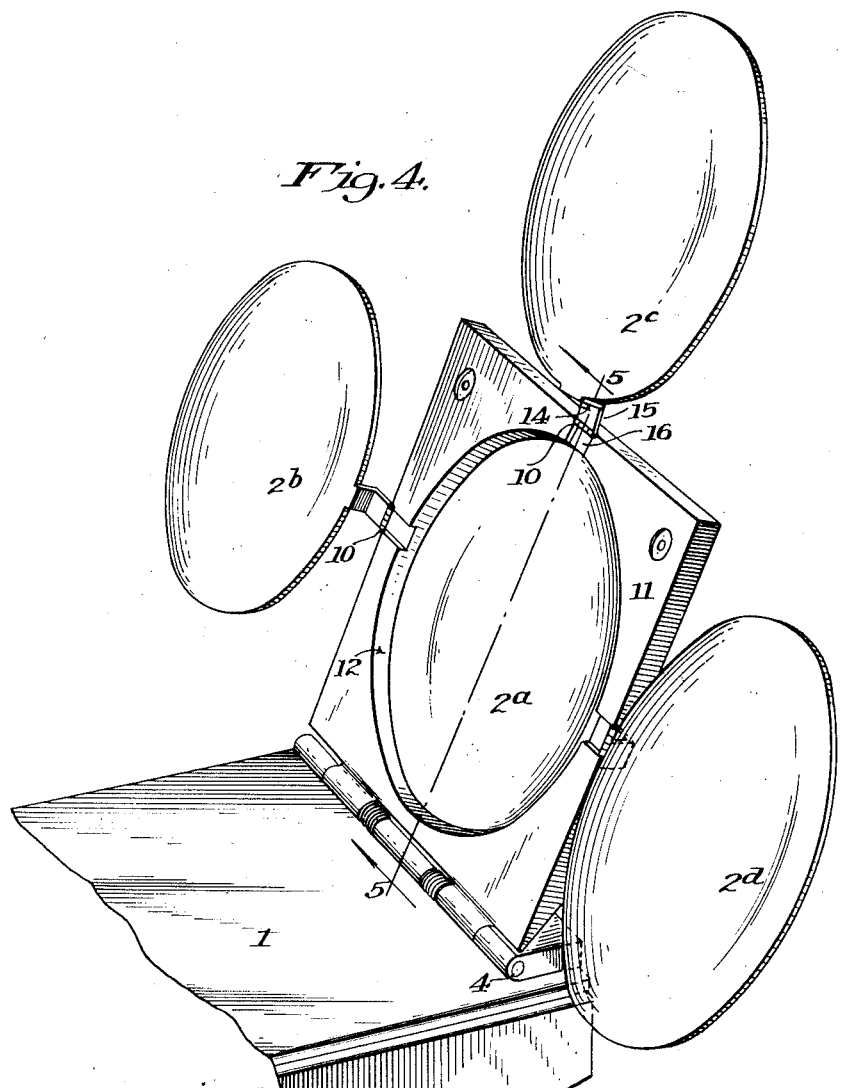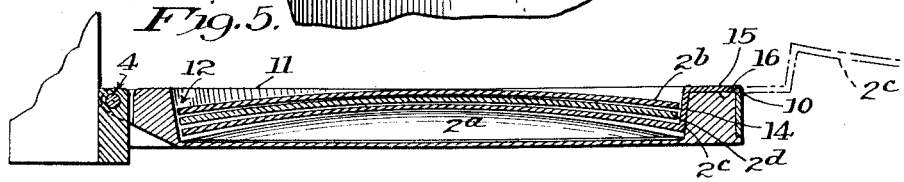

May 18, 1937.　　　D. W. NORWOOD　　　2,080,434
ILLUMINATION REFLECTOR FOR USE IN PHOTOGRAPHY
Filed Aug. 31, 1934　　　3 Sheets-Sheet 3
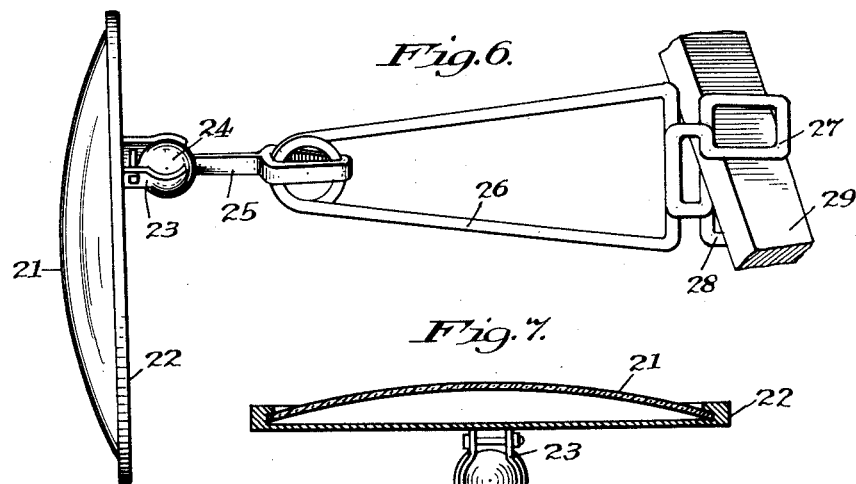
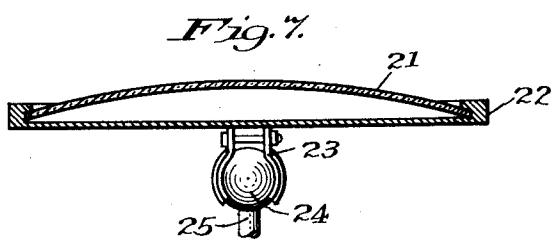
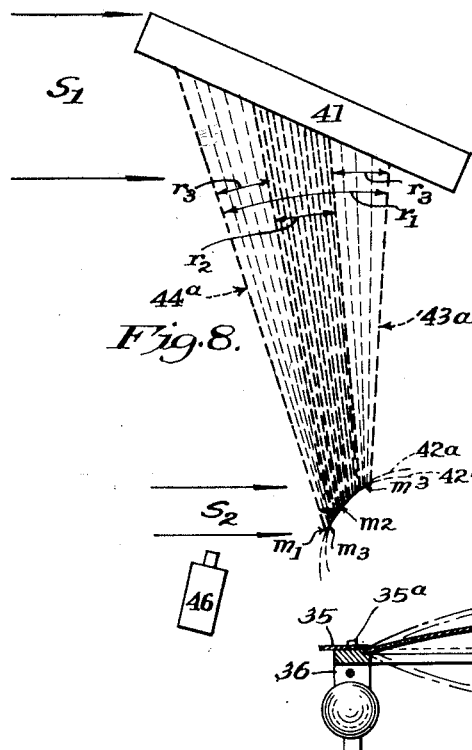
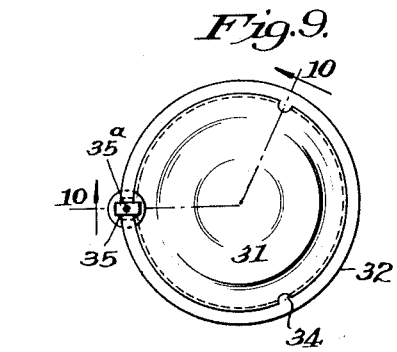
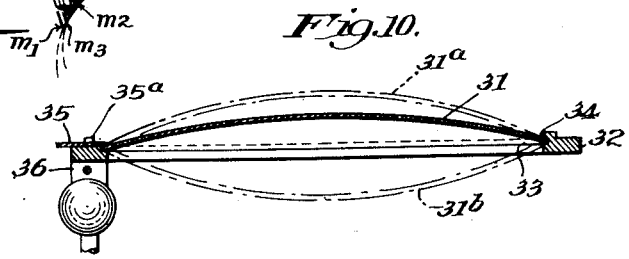
INVENTOR.
Donald W. Norwood
BY
ATTORNEYS.

Patented May 18, 1937

2,080,434

UNITED STATES PATENT OFFICE 2,080,434

ILLUMINATION REFLECTOR FOR USE IN PHOTOGRAPHY

Donald W. Norwood, Pasadena, Calif.

Application August 31, 1934, Serial No. 742,235

6 Claims. (Cl. 88—74)

This invention relates to the art of photography and particularly to an improved illuminating device for secondary illumination of a photographic subject.

The present invention is directed particularly to an improvement useful in amateur motion picture and "still" photography, but it will be appreciated that it is equally adapted to professional motion picture and "still" photography. Certain parts of the following description will pertain particularly to amateur photography for the reason that in this field the advantages of the present invention are most fully attained.

This application is a continuation in part of my co-pending application Serial Number 686,103, filed August 21, 1933, which issued as Patent Number 1,992,233.

It may be said that the principal proportion of amateur photography and a considerable proportion of professional photography is carried out with sunlight as the source of illumination for the photographic subject, and it is well known that the lights and shadows produced in this manner are quite contrasting unless a certain amount of side illumination which illuminates the subject from an angle differing from the angle of the sun rays is attained, in order that these shadows may be somewhat illuminated and the contrast thereby reduced. In order to obtain a more uniform illumination of a subject it is common practice in professional photography to employ suitable reflectors for obtaining a diffuse reflection of the sunlight upon the shadowed surfaces of the subject. The reflecting apparatus used by professional photographers is ordinarily quite bulky for the reason that it is necessary to obtain a relatively large area of quite diffuse illumination. Under some conditions and in some circumstances, artificial illumination is often employed, for decreasing the contrast in the illuminated subject, as by means of flood lights, spot lights or the like.

In amateur photography it is not feasible to carry about a large quantity of bulky reflecting apparatus or artificial illuminating means, and hence, heretofore, amateur photographers have had to content themselves with the illumination at hand and have had to limit their photographic activities to conditions such that the desired illumination is obtained without reflected or auxiliary artificial light. In many cases, it is absolutely impossible to obtain the desired illuminating effects by direct sunlight, or by a single source of artificial light, and the field of amateur photography has therefore been seriously restricted.

As a specific example, numerous very striking effects may be obtained by so-called "back" lighting, such as by having the principal illumination fall on the rearward side of a photographic subject, but in this case, the illumination of the forward or camera side of the subject is comparatively low, and it is necessary to provide some means of secondary illumination therefor in order to obtain a suitable photographic register. Even in professional photography, certain situations arise in which the source or character of illumination is not suitable for good photography, particularly in news photography, and while it is possible to use "photo-flash lamps" or flashlight exposures for "still" photography to assist or modify the existing illuminating facilities, such assistance may not be had for motion picture photography, and a news-reel photographer may not carry about or use any bulky reflecting apparatus. Thus the present invention is of particular advantage in that a very portable device may be utilized to produce the necessary secondary illumination.

The use of small reflecting surfaces having a relatively high reflecting power and a relatively low diffusing power, such as tin or aluminum-foil reflectors, has not met with any particular success due to the fact that the area of illumination obtained is rather small and frequently not sufficiently uniformly diffusing to produce a secondary illumination which is free of secondary high-lights and shadows. If a plane reflecting surface small enough to be easily portable, such as a plane mirror, is employed, the area which may be illuminated thereby is relatively small as compared with the usual dimensions of the subjects to be illuminated and the illumination itself is more intense than is required. I have found that side or secondary illumination may be advantageously obtained by reflection from a curved mirror, that is, from a curved nearly perfect or highly reflecting surface. Such a mirror may be employed to reflect sunlight or other primary illumination onto a subject in a divergent beam, which makes it possible for a relatively small reflecting surface to be used to illuminate a relatively large photographic subject at an intensity considerably lower than the intensity of the primary illumination, yet at an intensity sufficient to suitably diminish the contrast of the illuminated subject. For example, a person's left may be photographed with full sunlight falling onto the person's face, and a curved reflecting surface disposed a short distance to the person's right in the full beam of the sunlight and adapted to reflect a cone of illumination sufficient to cover the photographic field and at an angle of, for example, 90° or more to the direction of the sunlight. If the subject to be illuminated is quite small, such as a person's face, the curved reflector may be placed quite close, in which case the illumination will be fairly intense and the area covered thereby will be quite small, or the same reflector may be moved to a greater distance and the intensity of secondary illumination reduced and the area of illumination correspondingly increased. The intensity and area of secondary illumination may also be varied by using reflectors of different curvatures, as hereinafter set forth. If it is desired to use two or more secondary illuminators, a suitable number of curved reflecting surfaces may be disposed at suitable angles with respect to the subject, and placed at differing distances therefrom so that the desired intensity and area of the several angles of illumination are adjusted to suit the photographic requirements.

As another example a mirror of relatively slight curvature may be employed to secondarily illuminate but a portion of the photographic subject or to "super-illuminate" such a portion. For example, where a group of individuals or objects are in the photographic field, a single individual or object may be made to stand out over the other individuals or objects by accentuating the illumination on such individual or object, after the procedure employed in "still" photography through the use of a spot-light or the like. Were a plane mirror to be used for this purpose it would be necessary that the mirror be of substantially the exact size of the area to be super-illuminated and the outer boundaries of the spot of illumination would be very abrupt, while by the use of a curved mirror the size of the spot illuminated may be varied by varying the distance between the mirror and the subject, and the boundaries may be made quite gradual, by suitable selection of the mirror curvature, thus contributing advantageously to the photographic effects obtainable.

In view of the above, one of the particular objects of the present invention is to provide an improved form of illuminating device of a highly portable nature, which may be incorporated in or attached to the camera carrying-case, and which may be used to obtain secondary illumination of a photographic subject by reflection of light derived from a primary source of illumination in a divergent beam.

A further object of the present invention is to provide a reflecting device comprising a nonplanar highly reflecting surface of compound curvature, whereby certain reflecting portions of said surface act to produce a divergent beam of small divergence by reflection of incident light and other portions of said surface act to produce a divergent beam of greater divergence, such reflected beams of differing divergence preferably lying substantially along the same axis.

A further object of the invention is to provide a portable illuminating device having a supporting structure adapted to receive one or more nonplanar reflecting mirrors whereby any one of a number of mirrors of differing curvatures may be alternatively mounted in said supporting structure to provide alternative degrees of secondary illumination.

Further objects of the invention will be specifically pointed out in the following description or will be apparent therefrom.

The secondary illumination device of the present invention may comprise, in its simplest form, a non-planar mirror of high optical quality and high reflecting power, provided with suitable mounting means whereby said mirror may be positioned at any suitable angle and distance with respect to the subject to be illuminated, and adapted to receive light from a primary light source and reflect the same in a divergent beam onto said subject. The device may comprise a suitable supporting means adapted to receive a curved mirror, such as a convex or concave mirror, of glass, polished metal, or other material, and may advantageously comprise a holder means incorporated in or attached to the conventional camera carrying-case.

The reflecting device is preferably formed as a non-planar mirror having a compound reflecting surface whereby two co-axial beams of differing divergence may be reflected from a single reflecting unit.

A simple form of the invention may comprise a non-planar mirror mounted upon or associated with a portable supporting means, and I prefer to use a camera carrying-case as the said supporting means for such a mirror, in order to avoid the necessity of carrying about an additional separate piece of equipment. The mirror may be rigidly affixed to or mounted upon the camera carrying-case or other supporting means, in which case the angular adjustment of the mirror to provide the desired secondary illumination of the subject may be obtained by properly positioning the supporting means and its associated mirror, but I prefer to adjustably mount the mirror on the portable supporting means, so that the mirror may be independently adjusted to different angular positions with respect to said supporting means.

Certain embodiments of the device of the present invention are shown in the accompanying drawings and referring thereto:

Fig. 1 is a perspective view of the preferred form of the device, showing the reflecting mirror in operating position;

Fig. 2 is a sectional view thereof taken on line 2—2 in Fig. 1;

Fig. 3 is a detail on somewhat enlarged scale of a type of frictional mounting or hinge means which may be used to attach the mirror frame to the camera carrying-case in this particular embodiment of the invention;

Fig. 4 is a view corresponding generally to Fig. 1, showing a modified form of mirror supporting means providing a plurality of reflecting mirrors of differing degrees of curvature;

Fig. 5 is a sectional view thereof taken on line 5—5 in Fig. 4, with the mirrors in folded position;

Fig. 6 is a perspective view of an alternative form of the device, showing the same clamped to a suitable supporting structure;

Fig. 7 is a sectional detail thereof;

Fig. 8 is a schematic representation of the use of a preferred form of reflecting means of the present invention, providing secondary illumination for a photographic subject;

Fig. 9 is a front view of a modified form of the reflector holding means according to the present invention;

Fig. 10 is a sectional view thereof taken on line 10—10 in Fig. 9.

Referring particularly to Figs. 1 to 3, the conventional camera carrying-case, or other suitable base member, is indicated at 1, and the reflecting element 2 of the present device is shown as mounted in a holder element 3, hingedly secured to the camera case adjacent one end thereof as at 4. The reflecting element 2 may comprise a silvered glass mirror, if desired, but I prefer to employ a mirror formed of polished stainless steel or the like, whereby the element of breakage is eliminated. The element 2 may be disposed in a suitable recess 5 in the holder 3, and may be held in position by means of a spring clip 6 disposed in a suitable groove 7. The spring clip 6 may be provided with projecting end portions 6a to facilitate easy removal thereof to provide for withdrawal of the element 2, and in this connection the element 2 may be provided with convex and concave opposite sides, of differing curvature, as shown at 2' and 2'' in Fig. 2, whereby reflected beams of differing divergence may be obtained with a single element by alternative use of the convex and concave surfaces, the respective positions of the mirror being shown in full and dot-dash lines. The element 2 is of such shape as to conform to a surface of revolution, and is preferably provided with a compound surface curvature, for example, the central portion A of said element may be provided with a spherical curvature of one radius ($R_1$) and the marginal portions M of said element may be provided with a spherical curvature of a somewhat shorter radius ($R_2$). Fig. 8, which will be more fully described subsequently, illustrates the type and character of illumination obtainable by the use of such a compound reflecting surface.

The hinge mounting of the holder 3 to the carrying case 1 is preferably such as to provide a rather stiffly operable junction, whereby when the holder 3 is swung upwardly away from the carrying case to place the reflecting element 2 in the desired position, its position will be maintained. For this purpose, a suitable number of compression springs 8 may be provided in the joints of the hinge in the manner shown, or any other suitable type of frictional engagement of the hinge portions may be provided. Any suitable means may be provided for securing the holder in folded position against the wall of the case 1, as for example, snap catches such as shown at 9.

The holder 3 is preferably provided with a solid black portion 3' which extends over the area of the reflector 2, as shown in Fig. 2, so that when said holder is swung or folded inwardly to a position alongside the carrying-case said back portion serves to cover and protect the reflector, but when the holder is swung to a position inclined away from the carrying case the reflector is exposed for use in the desired manner as described herein.

The form of device shown in Figs. 4 and 5 is entirely comparable to the form of device shown in Fig. 1, with the exception that the holder 11 is made somewhat thicker than the holder 3, whereby a recess 12 of increased depth is provided, and a plurality of mirrors or reflecting elements 2a, 2b, 2c, and 2d are disposed within said recess, the lower element 2a being advantageously mounted within the recess and, if desired, forming the bottom thereof, and the elements 2b, 2c, and 2d being hingedly mounted as at 10 upon the holder 11 at the respective sides and upper end thereof whereby one or more of such elements 2b, 2c, and 2d may be folded outwardly of the holder 11 and placed in position to supplement the reflected illumination obtained by the element 2a. In this connection the several elements 2a, 2b, 2c, and 2d may be made of differing curvature, if desired, whereby reflected beams of differing divergence may be directed upon the photographic subject, according to the illumination problem at hand in any particular instance. The hinge mounting of the elements 2b, 2c, and 2d is preferably such as to provide for swinging the elements to an angle somewhat in excess of 180 degrees from the folded position whereby said elements may be swung out of reflecting line in case illumination by the element 2a is desired solely. This hinge mounting may comprise, as shown partly in Fig. 5, a hinge strap 14 formed integrally with or secured to each mirror, for example, the mirror 2c, and extending at approximately 90° to such mirror a sufficient distance to agree with the position of such mirror within the recess 12 when folded, thence away from the mirror to the outer edge of the holder 11, as by means of a portion 15, where it may be hingedly secured as at 10 to such holder. The portion 15 of the hinge may be disposed in a suitable slot or notch 16 provided in the holder, whereby the hinge will be flush with the inner surface of the holder 11 when the mirror is in folded position. In Fig. 5 the mirror 2c is shown swung away from the recess 12 in a position lying substantially parallel to the plane of fixed mirror 2a, while in Fig. 4 such mirror is shown inclined at a slight angle to such plane.

If illumination by any one of the swinging mirrors is desired solely, the remaining swinging mirrors may be swung into folded position to cover the element 2a and expose the rearward sides of such mirrors to the source of direct illumination, and in this connection the rearward side of the swinging elements may be suitably blackened so as to provide for reflection from but one side of the element. The hinge mounting 10 is preferably of a frictional nature so that the mirrors may be caused to persist in position when placed in the desired adjustment. The above described arrangement of a plurality of reflecting elements provides for a compound illumination of the photographic subject, and if the several reflecting elements are provided with differing radii of curvature, certain portions of the photographic subject may be high-lighted in substantially any desired manner. According to Figs. 4 and 5, these several reflecting elements are shown as provided with a compound surface curvature as described in connection with the form of device shown in Figs. 1 to 3, but it will be appreciated that these elements may be of uniform surface curvature, if desired, without departing from the spirit of this invention.

Referring particularly to the modification shown in Figs. 6 and 7, a curved reflector 21, which is shown as being a convex mirror, is mounted in a holder 22 provided with a bracket 23 preferably adjacent one edge of the mirror, within which is mounted a ball 24 having an arm 25 secured to a spring clamp 26, said clamp 26 being provided with clamp members 27 and 28 adapted for engagement with a suitable supporting structure 29. The spring clamp 26 may be secured to any desired relatively fixed element, such as a chair, post, tree branch, or the like, and, due to the universal adjustment attainable through the mounting of the ball 24, the reflector 21 may be positioned at any suitable angle to obtain reflection in the desired direction upon the subject to be illuminated. The universal mounting means, such as shown at 23 and 24, is preferably disposed eccentrically with respect to the mirror, so as to permit a considerable adjustment in the position of the mirror with respect to the supporting means.

In Figs. 9 and 10 I have shown a curved mirror 31 mounted in a holder 32 in such manner as to be easily removable to provide for substitution of mirrors of different focal length or different radius of curvature, such as indicated by dot-dash lines in Fig. 10 at 31a and 31b. The mirror may be disposed on a suitable ledge 33 within the holder 32 and said holder may be provided with suitable lugs 34 spaced about the inner periphery of the holder at one side and a movable latch member 35 at the other side of said holder, whereby said mirror may be removed from the holder upon occasion and a different mirror substituted therefor. The latch member 35 may conveniently comprise a metal strip pivotally mounted as at 35a on the holder 32 and adapted to be swung to one side to permit one side of the mirror to be lifted from the ledge 33. This arrangement provides for securing any one of a plurality of mirrors within the holder 32 and these mirrors may comprise convex mirrors of differing focal length as shown at 31 and in dot-dash lines 31a, or may comprise concave mirrors such as indicated in dot-dash lines at 31b. The holder 32 may be provided with a suitable bracket 36 adapted to engage a universal ball after the manner of the engagement of the bracket 23 with the ball 24 above described, and the ball may be suitably secured to supporting means such as the spring clamp 26 shown in Fig. 6.

Fig. 8 shows a method of employment of a single reflecting element of compound curvature, such as the device shown in Figs. 1 to 3, in which an accentuated illumination is obtained in the central portion of the reflected divergent beam. Referring to this figure, the photographic subject 41 is shown as illuminated by light derived from any suitable source of primary illumination, such as sunlight, said light rays being designated by the arrows $S_1$, and the secondary illumination for such subject is provided by a small mirror $m_1$ positioned to reflect a light beam $S_2$, also derived from the source of primary illumination, onto the subject 41 in a divergent beam $r_1$. In order that the spot of secondary illumination provided in this manner be such that the outer edges thereof gradually diminish in intensity whereby no sharp line is observable at the boundaries of such spot, the mirror $m_1$ is preferably provided with a compound curved surface. For example, the central portion of said mirror may be of relatively slight curvature as designated at $m_2$ and as indicated by the dotted projection 42a of this surface, and the outer or marginal portion $m_3$ of the mirror may be of a greater curvature, such as indicated by the dotted projections 42b. With this construction the cone of illumination provided by the beam $r_1$ may be made up of a central cone, designated at $r_2$ and reflected from the mirror portion $m_2$, of relatively great intensity, and an outer hollow cone designated at $r_3$, which gradually decreases in intensity from the inner cone $r_2$ to the boundaries designated at 43a and 44a. It will be appreciated that the marginal mirror portions may be made of gradually increasing curvature so that a uniform decrease in intensity of the illuminated area is attained from adjacent the limits of the central cone $r_2$ to the outer margins of the hollow cone $r_3$. If it is desired to illuminate a larger or smaller area of the subject 41 the mirror $m_1$ may be moved the required distance rearwardly or forwardly with respect to said subject. The camera may be positioned in any desired location with respect to the illuminating both primary and secondary, for example, at some suitable location such as shown at 46.

It will be appreciated that either sunlight or artificial illumination may be used with the device of the present invention equivalently as a source of primary illumination. Furthermore, while the above description pertains particularly to the use of a convex mirror, it will be appreciated that, according to the law of optics, a concave mirror will function exactly as does a convex mirror of the same radius of curvature as far as the intensity and angle of divergence of the reflected beam is concerned. Some difference will exist between convex and concave mirrors in regard to the position of the apparent focal point thereof, such focal point being disposed rearwardly of a convex mirror and forwardly of a concave mirror. The expression "curved reflecting surface", or any comparable expression, will be taken to mean either a convex or concave reflector, and it is also apparent that the curved mirror of the present invention is not necessarily one having a truly spherical curvature, inasmuch as it may be made in any desired non-planar surface configuration, such as ellipsoidal, or the like, without departing from the spirit of this invention.

In some cases, advantageous illuminating effects may be obtained by using a reflecting surface whose curvature progressively increases from the central portion toward the marginal portion thereof, so as to provide a gradual diminution in intensity of the reflected light beam from the central portion toward the marginal limits thereof. Furthermore, this progressive increase in curvature may be uniform or non-uniform, and may be present throughout the entire area of the surface or any desired portion thereof. For example, in the form of a mirror shown in Fig. 8, the central portion $m_2$ may be made of uniform relatively small curvature, while the marginal portion $m_3$ may be made of gradually increasing curvature from its inner toward its outer edge.

I claim:

1. A device for use in the secondary illumination of photographic subjects comprising: a camera carrying-case; and a reflector hingedly mounted upon said carrying-case for angular adjustment and positioning relative thereto and having a non-planar reflecting surface conforming to a surface of revolution and having its marginal portions of greater surface curvature than the central portion thereof.

2. The device set forth in claim 1, said reflecting surface comprising a surface of progressively increasing curvature in a direction from the central portion of said surface outwardly toward the marginal portions of said surface.

3. The device set forth in claim 1, the central portion of said surface being of relatively slight curvature and the marginal portions of said surface being of progressively increasing curvature from said central portion outwardly toward the outer edge of said marginal portions.

4. A device for use in the secondary illumination of photographic subjects which comprises: a camera-carrying case constituting a base member; a reflector holder hingedly mounted on one side of said camera case adjacent one end thereof through the agency of a friction type hinge member and provided with a recess, said holder being mounted in position to fold downwardly against the side of said case, said recess being disposed in that side of said holder which lies against said case and said holder being adapted to rest in any angular position with respect to said base member through the agency of said friction type hinge; and a reflector element disposed in said recess and provided with a curved reflecting surface of high reflecting power, said curved reflecting surface comprising a surface of compound curvature conforming to a surface of revolution, the central portion of said surface being of relatively slight curvature and the marginal portion of said surface being of greater curvature than said central portion.

5. A device for use in the secondary illumination of photographic subjects which comprises: a camera-carrying case constituting a base member; a reflector holder hingedly mounted on one side of said camera case adjacent one end thereof through the agency of a friction type hinge member and provided with a recess, said holder being mounted in position to fold downwardly against the side of said case, said recess being disposed in the side of said holder which lies against said case and said holder being adapted to rest in any angular position with respect to said base member through the agency of said friction type hinge; a reflector element disposed in said recess and provided with a curved reflecting surface of high reflecting power; and a plurality of mirrors of different curvatures each adapted for disposal within said recess, each of said plurality of mirrors being hingedly mounted on said holder and movable into and out of position within said recess.

6. A device for use in the secondary illumination of photographic subjects which comprises: a camera-carrying case constituting a base member; a reflector holder hingedly mounted on one side of said camera case adjacent one end thereof and provided with a recess, said holder being mounted in position to fold downwardly against the side of said case and said recess being disposed in that side of said holder which lies against said case; a reflector element disposed in said recess and provided with a curved reflecting surface of high reflecting power; and a plurality of mirrors of different curvatures each adapted for disposal within said recess, each of said plurality of mirrors being hingedly mounted on said holder and movable into and out of position within said recess.

DONALD W. NORWOOD.